(12) United States Patent
Simpson et al.

(10) Patent No.: US 10,409,047 B2
(45) Date of Patent: *Sep. 10, 2019

(54) HIGH FRAME-RATE MULTICHANNEL BEAM-SCANNING MICROSCOPY

(71) Applicant: PURDUE RESEARCH FOUNDATION, West Lafayette, IN (US)

(72) Inventors: Garth Jason Simpson, West Lafayette, IN (US); Charles Addison Bouman, West Lafayette, IN (US); Ryan Douglas Muir, West Lafayette, IN (US); Shane Sullivan, West Lafayette, IN (US); Justin Allen Newman, West Lafayette, IN (US); Mark Carlsen, West Lafayette, IN (US); Suhas Sreehari, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 94 days.

This patent is subject to a terminal disclaimer.

(21) Appl. No.: 15/724,738

(22) Filed: Oct. 4, 2017

(65) Prior Publication Data
US 2018/0045939 A1   Feb. 15, 2018

Related U.S. Application Data

(63) Continuation of application No. 14/735,959, filed on Jun. 10, 2015, now Pat. No. 9,784,960.
(Continued)

(51) Int. Cl.
G02B 21/00 (2006.01)
G02B 26/10 (2006.01)

(52) U.S. Cl.
CPC ..... *G02B 21/0084* (2013.01); *G02B 21/0048* (2013.01); *G02B 21/0076* (2013.01); *G02B 26/101* (2013.01)

(58) Field of Classification Search
CPC .............. G02B 21/0084; G02B 26/101; G02B 21/0048; G02B 21/008
See application file for complete search history.

(56) References Cited

U.S. PATENT DOCUMENTS

| 7,990,524 B2 * | 8/2011 | Jureller ................ G02B 21/008 356/36 |
| 8,050,520 B2 * | 11/2011 | Weir .................. A61B 1/00096 359/214.1 |

(Continued)

*Primary Examiner* — Tsion B Owens
(74) *Attorney, Agent, or Firm* — Purdue Research Foundation

(57) ABSTRACT

A beam-scanning optical design is described for achieving up to kHz frame-rate optical imaging on multiple simultaneous data acquisition channels. In one embodiment, two fast-scan resonant mirrors direct the optical beam on a circuitous trajectory through the field of view, with the trajectory repeat-time given by the least common multiplier of the mirror periods. Dicing the raw time-domain data into sub-trajectories combined with model-based image reconstruction (MBIR) 3D in-painting algorithms allows for effective frame-rates much higher than the repeat time of the Lissajous trajectory. Because sub-trajectory and full-trajectory imaging are different methods of analyzing the same data, both high-frame rate images with relatively low resolution and low frame rate images with high resolution are simultaneously acquired.

8 Claims, 8 Drawing Sheets

Related U.S. Application Data

(60) Provisional application No. 62/009,944, filed on Jun. 10, 2014.

(56) References Cited

U.S. PATENT DOCUMENTS

| | | | | |
|---|---|---|---|---|
| 9,019,176 B2* | 4/2015 | Hanada | ............... | G09G 1/10 |
| | | | | 345/15 |
| 2003/0063367 A1* | 4/2003 | Widzgowski | ...... | G02B 21/0048 |
| | | | | 359/287 |
| 2004/0217270 A1* | 11/2004 | Publicover | ............ | G01Q 10/06 |
| | | | | 250/234 |
| 2013/0307887 A1* | 11/2013 | Hanada | ............. | G02B 26/0833 |
| | | | | 345/691 |
| 2015/0078506 A1* | 3/2015 | Noo | ................. | G06T 11/003 |
| | | | | 378/4 |
| 2015/0234170 A1* | 8/2015 | Witte | ............... | G02B 21/365 |
| | | | | 348/79 |

\* cited by examiner

HIGH FRAME-RATE MULTICHANNEL BEAM-SCANNING MICROSCOPY

CROSS-REFERENCE TO RELATED APPLICATIONS

The present U.S. patent application is a continuation of U.S. patent application Ser. No. 14/735,959, filed Jun. 10, 2015, which is related to and claims the priority benefit of U.S. Provisional Patent Application Ser. No. 62/009,944, filed Jun. 10, 2014, the contents of which is hereby incorporated by reference in its entirety into this disclosure.

STATEMENT OF GOVERNMENT INTEREST

This invention was made with government support under GM103401 and GM103910 awarded by the National Institutes of Health. The government has certain rights in the invention.

TECHNICAL FIELD

The present disclosure generally relates to high speed confocal imaging, and in particular to trajectory beam scanning for high speed imaging.

BACKGROUND

This section introduces aspects that may help facilitate a better understanding of the disclosure. Accordingly, these statements are to be read in this light and are not to be understood as admissions about what is or is not prior art.

Motion and change are inherent properties of living systems. The time-scales for quantitatively observing dynamic samples can span microseconds for chemical reactions to milliseconds to seconds for cell and organism motion. Technological advances continue to provide access to new regimes in high-speed imaging capable of capturing full volume renderings at rates previously reserved for single frame acquisitions. High speed cameras with kHz frame rates capable of low-light detection have helped propel new methods for biological microscopy. High frame-rate 3D sectioning capabilities have also been achieved using temporal focusing for two-photon fluorescence and light-sheet microscopy for conventional fluorescence.

Despite these successes, current approaches for high frame-rate imaging using camera-based platforms still suffer from several practical limitations. Firstly, imaging with high frame rates requires high signal to noise ratio (S/N) within each pixel. When detecting sample fluorescence, the high turn-over rates required to produce such S/N can potentially result in significant photobleaching and/or phototoxicity from undesired photochemical reactivity and local heating within the sample. In addition, camera-based imaging is not generally compatible with imaging methods that scale non-linearly with the incident intensity, including two-photon excited fluorescence (TPEF), second harmonic generation (SHG), coherent anti-Stokes Raman microscopy, and stimulated Raman gain/loss imaging, all of which typically benefit from the higher intensities encountered in beam-scanning instruments. However, one of the most significant limitations of camera-based approaches for high speed biological imaging is the practical difficulties associated with extension to multi-channel detection. Multi-channel detection underpins colocalization experiments, fluorescence resonance energy transfer (FRET) imaging, depolarization ratio detection, and spectral detection. Each channel of detection requires a dedicated high-speed, high sensitivity camera when using the most common high speed microscopy approaches. In addition to the increased complexity and cost of multi-camera detection, precise spatial registry can be challenging to establish and maintain between multiple cameras. In this respect, beam-scanning instruments with multiple single-channel detectors running in parallel offer distinct advantages.

Fast beam-scanning approaches capable of easily supporting multi-channel detection are now well established for video-rate microscopy. Beam-scanning is most commonly achieved by combining a slow-scan galvanometer mirror with a resonant mirror or a rotating polygon mirror for video-rate imaging. However, achieving kHz frame rates using a beam-scanning microscope remains challenging. A 512×512 image contains ~260,000 pixels, leaving <4 ns per pixel for a 1 ms acquisition to perform the beam positioning and data acquisition. The short duration imposes significant constraints on the beam positioning hardware, the data acquisition electronics, and the sample (e.g., through effects such as saturation, phototoxicity, and multiphoton absorption, etc.).

There is therefore an unmet need for a high frame-rate imaging technique to resolve the current deficiencies in current imaging techniques as outlined above.

SUMMARY

In one aspect, the present invention relates to a system for beam-scanning and imaging. The system has two synchronized fast-scanning resonant mirrors of differing resonant frequencies to scan the beam in a Lissajous trajectory across a sample surface, implementation of a data acquisition and analysis technique for binning the image data into user-defined temporal bins, resulting in user-defined frame-rates; and a strategy for interpolating the values of unsampled pixels using image interpolation 'inpainting' techniques, which include but is not limited to model-based image reconstruction (MBIR) and discrete cosine transform (DCT) coupled with a penalized least squares (DCT-LS), the image interpolation may use some or all of the available dimensions of information, including spatial information, temporal information, polarization information, and spectral information. The system is capable of achieving up to kHz frame-rate optical imaging. The system is also capable of achieving optical imaging on multiple simultaneous data acquisition channels.

DETAILED DESCRIPTION

Figure 1B:
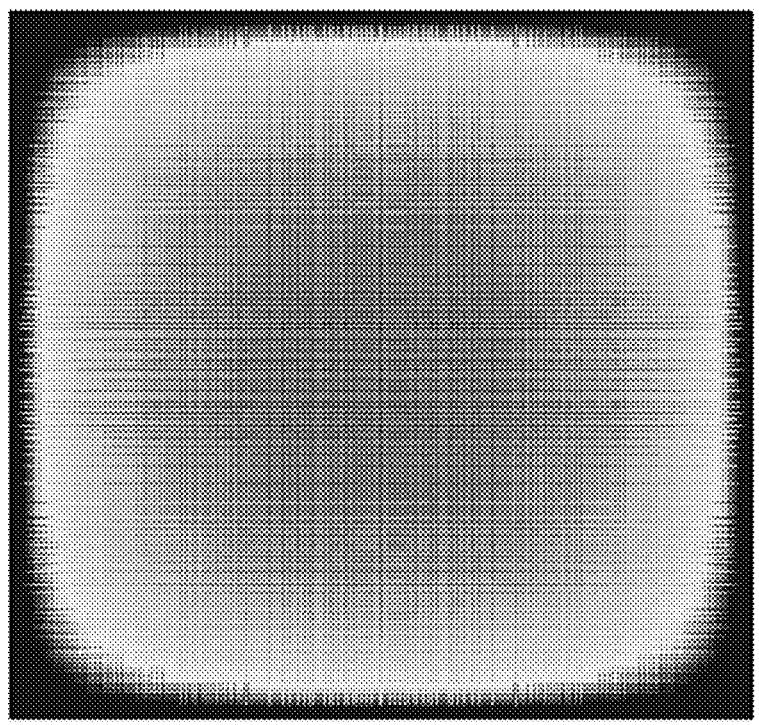
FIG. 1b is a pixel sampling density map of 7.083:8 Lissajous trajectory used in imaging.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Disclosed herein is a novel process wherein a Lissajous trajectory beam scanning technique is implemented on a beam-scanning microscope coupled with a 3D (2D in space, 1D in time) model-based image reconstruction (MBIR) algorithm to recover frame rates exceeding 1000 frames per second (fps) on multiple simultaneous data acquisition channels. By using two resonant fast-scan mirrors with high quality factors (Q>250) with active phase stabilization for performing the beam-scanning, the position of the beam may be known with high precision at each time-point in the trajectory. Digitizing the signals on multiple channels in synchronicity with the laser repetition rate (80 MHz) allows for reconstruction of high resolution images (>1 MPix). The MBIR algorithm to recover information in the unsampled pixels builds on the high redundancy in conventional image sets, such that the inherent information content may be expressed in much lower dimensionality basis sets.

Lissajous Trajectory Microscopy

Figure 1A:
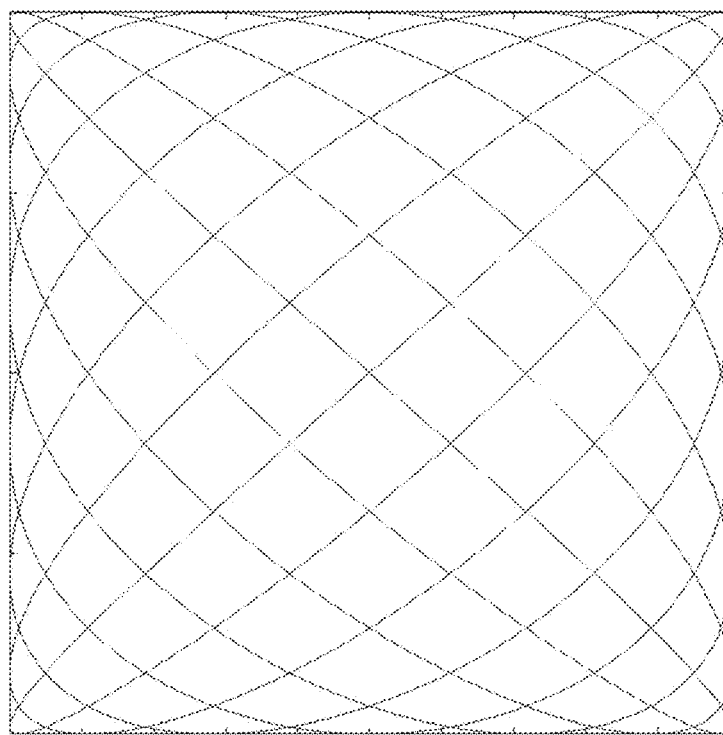
FIG. 1a is an example Lissajous trajectory for 7:8 pattern with equal amplitude; with the starting point being 0,0, and when the trajectory returns to the 0,0, the pattern repeats.

A Lissajous scan pattern is created by driving two orthogonal mirror axes with periods related to each other by an integer least common multiplier. For example, if the period of one mirror was 7/8 of the other, the least common multiplier would be 56, corresponding to 8 periods of the fast mirror and 7 periods of the slow mirror, as illustrated in FIG. 1*a*. In addition to the repeat time, the Lissajous trajectory is also dictated by the relative phases of the two mirrors. The overall position r of the beam as a function of time t is given by Eq. 1.

$$\vec{r}(t) = \hat{i} A_x \sin\left(\frac{2\pi t}{\tau_x} + \delta_x\right) + \hat{j} A_y \sin\left(\frac{2\pi t}{\tau_y} + \delta_y\right) \quad (1)$$

In Eq. 1, $A_x$ and $A_y$ are constants representing the amplitudes of the sinusoidal trajectories correlated with the x and y axes and $\delta_x$ and $\delta_y$ indicate the corresponding phases.

Lissajous trajectory microscopy has been explored previously in slower imaging applications to achieve frame-rates on the order of a few Hz. Lissajous trajectory beam scanning TPEF microscopes were previously built with MEMS mirrors or fiber scanners. Lissajous trajectories have also been utilized in other applications such as atomic force microscopy (AFM). In general, these previous strategies utilized relatively low least common multipliers or nonrepeating Lissajous trajectories with correspondingly low resolution images.

Figure 1C:
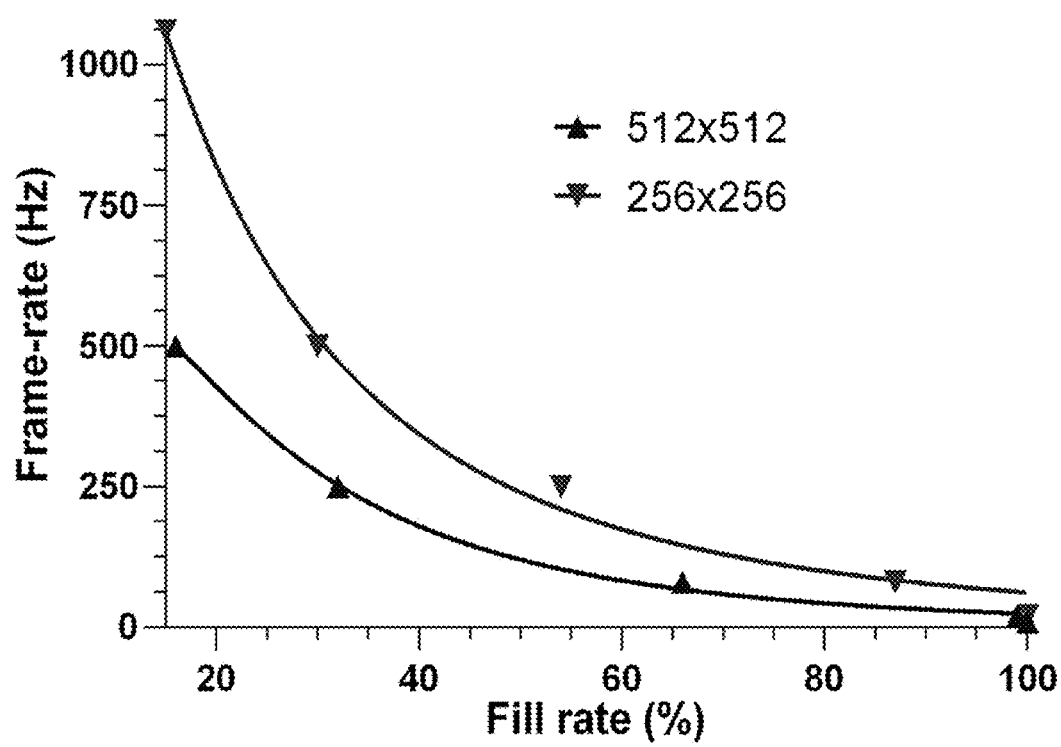
FIG. 1c is a plot of percent (%) fill rate versus frame-rate for the 5300:5986 Lissajous trajectory generating a 512×512 pixel image.

In contrast to other Lissajous studies, the trajectories investigated (the results of which are disclosed in the present disclosure) utilize several thousand consecutive periods of a resonant mirror prior to the repeating of the trajectory, with a frame-rate that is user definable. Lissajous trajectory microscopy has the distinct advantage over traditional raster scanning systems of allowing simultaneous acquisition of high resolution images at low frame-rates, as well as low resolution images at high frame-rates. The sample is coarsely imaged with only a few passes of the beam, with subsequent passes consecutively adding additional spatial information. Thus, a full Lissajous trajectory image may be temporally divided into several subframes to increase the effective imaging frame-rate with a corresponding tradeoff of in spatial resolution. FIG. 1*c* plots the frame-rate vs. pixel fill rate for the 10600:11972 Lissajous trajectory described herein.

Model-Based Iterative Image Reconstruction

The Lissajous-scanning pattern may leave large blocks of pixels unsampled in each frame at the higher frame rates, although those missing pixels are sampled at other time-points in the trajectory. For kHz regime frame-rates at a 256×256 resolution, less than 20% of the pixels in some frames are sampled. In dynamic systems, the sample may evolve over time, but the signal intensities in the unsampled pixels as a function of position are still correlated with the information in the preceding and following frames. In this way, information acquired as a function of both time and space may be used to more reliably estimate the appropriate intensities for the unsampled pixels, even for objects changing quickly in time. Such a case may be posed as an in-painting problem as described by Bertalmio et al. Inpainting problems have been solved using a variety of methods, including, but not limited to, partial differential equations (PDEs), patch-based interpolation, and sparse learned representations, which is an extension to singular value decomposition based on the K-means (K-SVD).

The algorithm used herein is unique in that a maximum a posteriori (MAP) estimation with a generalized Gaussian Markov random field (GGMRF) prior model is used, adopted within a 3 dimensional space-time neighborhood. In brief, the MAP estimate identifies the recovered image based on maximizing the probability of observing the measured data given additional imposed model-based constraints. These constraints describe relationships between pixels within a neighborhood. For example, in the simplest implementation of a Gaussian Markov random field, it is assumed that adjacent pixels are normally distributed with a similar mean. However, this simple approach typically does not recover sharp edge effects, resulting in significant blurring in the recovered images. The generalized Gaussian function that serves as the prior model in the GGMRF approach used in this work introduces additional shape parameters in the base Gaussian function, reducing the cost associated with high contrast edges in the images. In brief, the exponent in a standard Gaussian function is allowed to vary, with p=2 (quadratic case) corresponding to a standard Gaussian distribution and p=1 (total variation case) to an exponential (Laplacian) distribution. It is noteworthy that the GGMRF model in MAP estimation has been used successfully for recovering sharp edges in low-dose transmission tomography and for blur and noise corrupted images, but not in the context of 3D space-time inpainting demonstrated herein.

The herein disclosed algorithm represents an example of iterative model-based image reconstruction. The algorithm iterates to adjust the estimate for the image, with the degree of change controlled by the regularization. Mathematically, the inverse problem can be succinctly expressed as estimating $\hat{x}$ from y=Ax+W, where $\hat{x}$ is the MAP estimate of the original image, y is the observation, A is the Lissajous-scanning matrix, x is the underlying noise free and complete image, and W is noise. While formally the noise in the nonlinear optical measurements is likely to be Poisson-distributed, W is modeled as additive white Gaussian noise (AWGN) with a zero mean and a constant standard deviation to simplify subsequent analyses. For high means, the Poisson distribution converges to a Gaussian distribution.

Bayes theorem provides a starting point for relating the probability of observing the measured results given constraints imposed by the model, as shown in Eq. 2.

$$p(x|y) = \frac{p(y|x)p(x)}{p(y)} \quad (2)$$

With the MAP estimate, maximizing p(y|x)p(x) corresponds to recovering the most probable image estimate 2, since the denominator p(y) is a constant of x. In this notation, p(x|y) is the conditional probability of the original image x given the constraints of the measurements in y, and p(x) is the prior probability, which is representative of what x should be.

In practice, it is more convenient to minimize the negative logarithm. In this framework, the cost function c(x) to be minimized may be written as shown in Eq. 3.

$$c(x) = \frac{\|y - Ax\|^2}{2\sigma_W^2} + \frac{\sum_{\{i,j\} \in C} q_{i,j}|x_i - x_j|^p}{p\sigma_x^p} + \frac{\sum_{t \in T} r_t |x - x^{(t)}|^p}{p\sigma_t^p} \quad (3)$$

In Eq. 3:
p is a design parameter for the generalized Gaussian (chosen to be 1.05). (Note that it reduces to a quadratic case corresponding to a normal Gaussian when p=2);
$q_{i,j}$ are the spatial weights;
$r_t$ are the temporal weights;
C represents pair-wise cliques in space;
T represents temporal neighbors; and
x(t) is value of x at time-sample t, relative to the current time-sample.

The first term of c(x) corresponds to the forward model, with the next two terms corresponding to two separate regularizers: one for 2D space and one for 1D time. The relative weighting and scaling of each of the regularizers can be independently adjusted, as they represent distinct physical properties. The scale parameter $\sigma_x^p$ may be computed using the maximum likelihood (ML) estimator, which in the asymptotic limit is normally distributed, unbiased, and computationally efficient.

$$\hat{x} = \underset{x \geq 0}{\mathrm{argmin}}\{c(x)\} \quad (4)$$

The iterative coordinate descent (ICD) algorithm was used for performing the minimization in Eq. 4.

In addition to the iterative model-based image reconstruction approach, analysis is also performed using a complementary interpolation algorithm based on a discrete cosine transform (DCT) coupled with a penalized least-squares (LS) calculation, optimized for implementation in MatLab. A discussion of the DCT-LS algorithm and a comparison between the MBIR and DCT-LS results are included in Appendix-A.

Results/Discussion

Two model classes of time-varying samples were designed and used for characterization of the representative prototype Lissajous beam-scanning microscope, selected to represent two distinct effects commonly necessitating high-speed imaging. Sample movement related to fast sample translation (e.g., from sample vibration, heart-beating/breathing, etc.) was modeled by actively translating a sample during imaging. Transient changes in intensity within a fixed field of view (e.g., action potential imaging, vesicle budding, crystal nucleation, etc.) were modeled by performing fast polarization modulation of an SHG-active sample.

Figure 2A:
FIG. 2a is a high resolution Lissajous microscope image (25 Hz imaging) of a USAF 1951 Resolution Chart without translation.
Figure 2B:
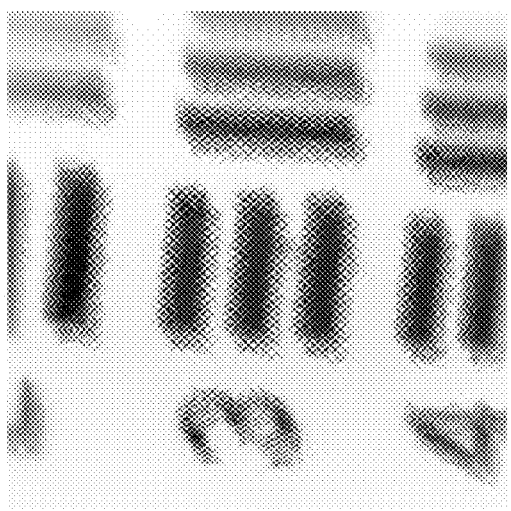
FIG. 2b is a Lissajous microscope image similar to that in FIG. 2a, but FIG. 2b shows that during rapid sample translation, significant blurring occurs.
Figure 2C:
FIG. 2c is an example image depicting blurring with traditional raster imaging (15 Hz).
Figure 2G:
FIG. 2*g* is an image showing the inpainted results of FIG. 2*f*.
Figure 2F:
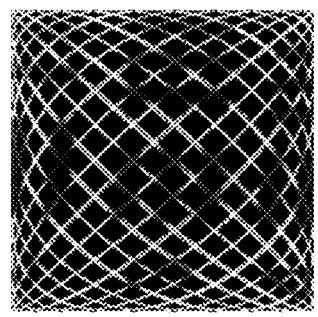
FIG. 2*f* is an image showing data rebinned into subtrajectories to give 1.25 KHz imaging and the resultant unsampled pixels.
Figure 2E:
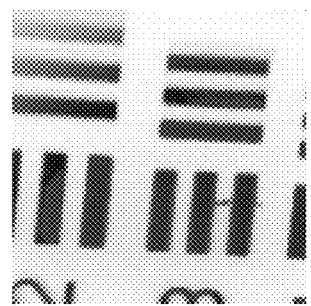
FIG. 2*e* is an image showing inpainted results of the data in FIG. 2*d*.
Figure 2D:
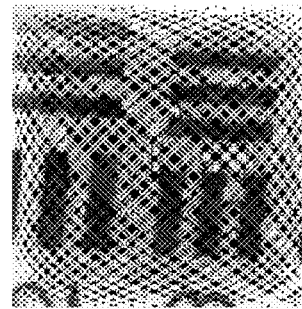
FIG. 2*d* is an image showing data rebinned into subtrajectories at 100 Hz to increase frame rate and reduce blurring with the resultant unsampled pixels.

In the first model, shown in FIGS. 2a-2g, the sample was rapidly translated during a 25 Hz Lissajous period image acquisition, such that the spatial position of the sample changed significantly during the course of a single Lissajous trajectory. FIG. 2a has a high resolution image of a USAF 1951 resolution test chart measured by laser transmittance, with no sample translation. FIG. 2b is of the test chart with rapid translation, resulting in motion blur. FIG. 2c contains an equivalent motion distortion image from traditional raster scanning at 15 Hz. FIGS. 2d-2g explore higher frame-rates with complimentary interpolation as a means of removing motion blur, with FIGS. 2d and 2f respectively showing sub-trajectories to 100 Hz and 1.25 KHz, and FIGS. 2e and 2g showing the respective interpolated results.

Figure 3:
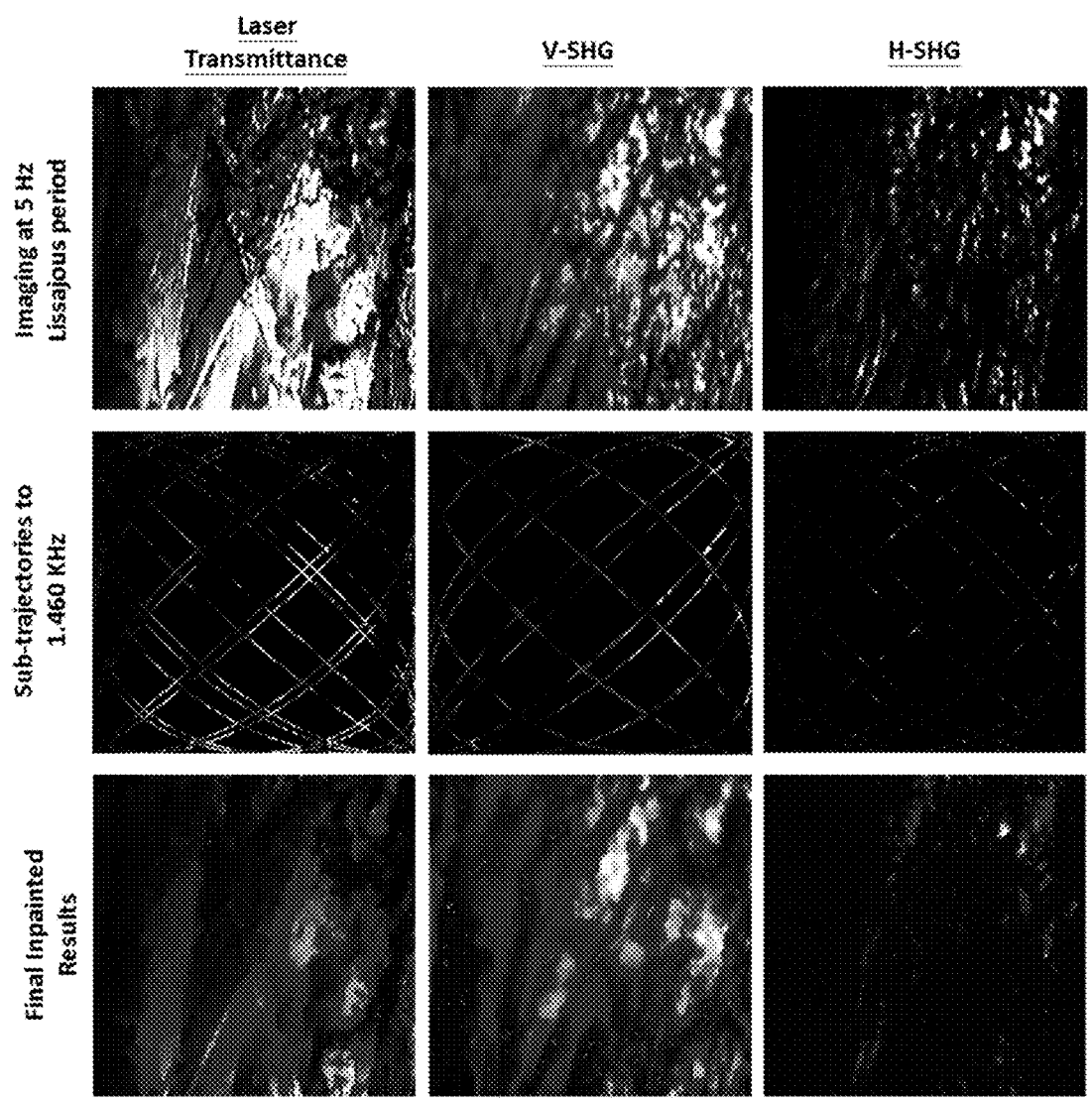
FIG. 3 is a set of images of urea crystals imaged on three different detectors with the incident optical polarization modulated at the Lissajous period.
Figure 4:
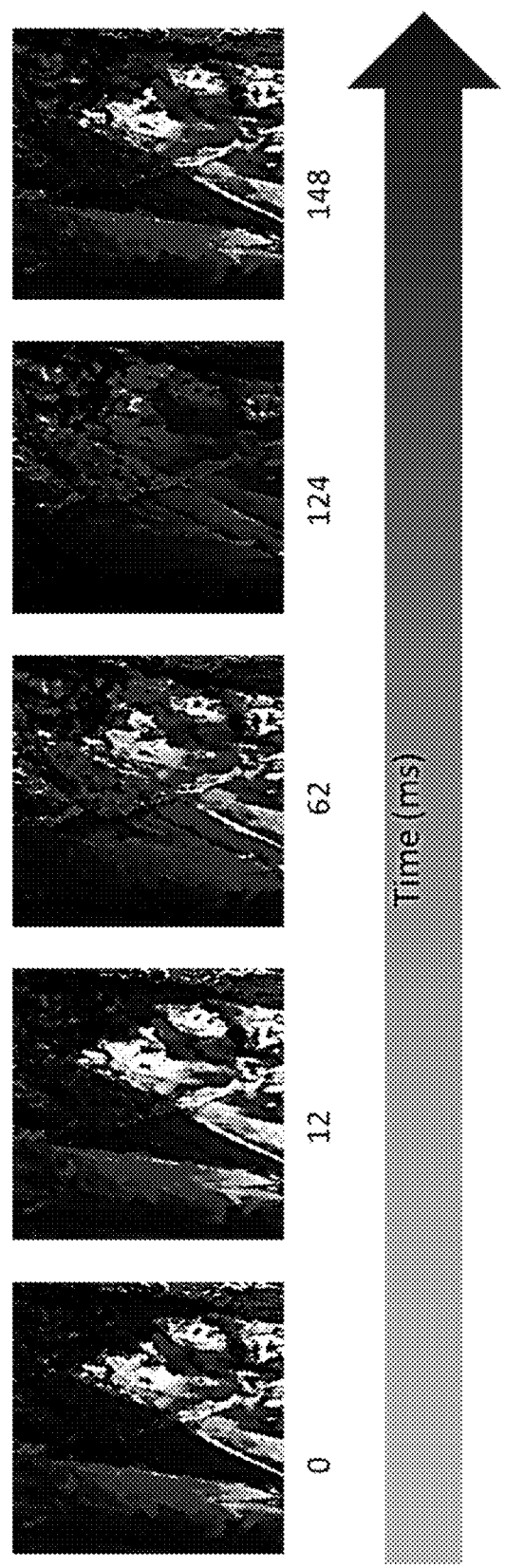
FIG. 4 is a set of selected frames from an example movie corresponding to the images in the last row of FIG. 3, first column.

A second model system was developed in which the sample was static in spatial locations, but exhibited transient localized differences in brightness. The measurements, shown in FIG. 3, were achieved by rapid polarization modulation SHG imaging of urea crystals. The period of the polarization modulation was equal to the Lissajous period, resulting in a time-averaged intensity of the field of view for images that are not divided into sub-trajectories. The SHG signal was separated into its horizontal and vertical components with a polarizing beam splitting cube before being detected by fast photomultiplier tubes (PMTS), for sensitive low-light detection (the second and third columns in FIG. 3), and complemented by the laser transmittance measurements (the first column in FIG. 3). Still referring to FIG. 3, the first row shows the full 5 Hz Lissajous period, and the last two rows show sub-trajectories to 1.460 KHz and interpolated results, respectively. The image for the last row was reconstructed based on the sparse sampling provided in the corresponding Lissajous trajectory in the middle row, combined with information from preceding and following spare samplings. The first and last rows are visually similar, though the first row integrates the intensity across the entire modulation period, and the last row features the intensity at a narrow time slice in the modulation period. Several frames from a movie featuring the 1.460 KHz temporal resolution are highlighted in FIG. 4, showing the change in intensity as a function of time for the different input polarizations.

Figure 5A:
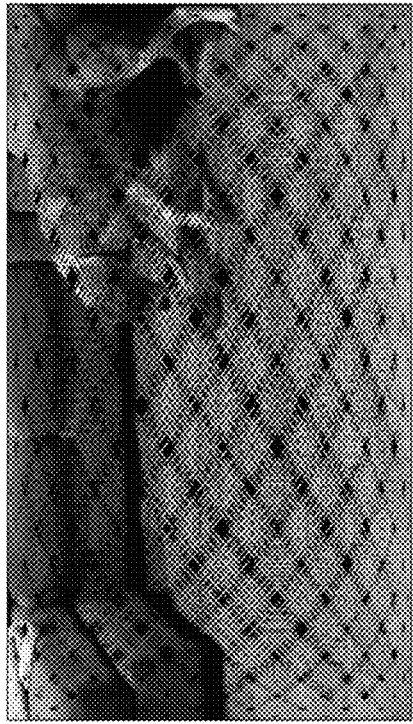
FIG. 5*a* is an image of an example movie as a surrogate for inpainting interpolation infidelity assessment.
Figure 5B:
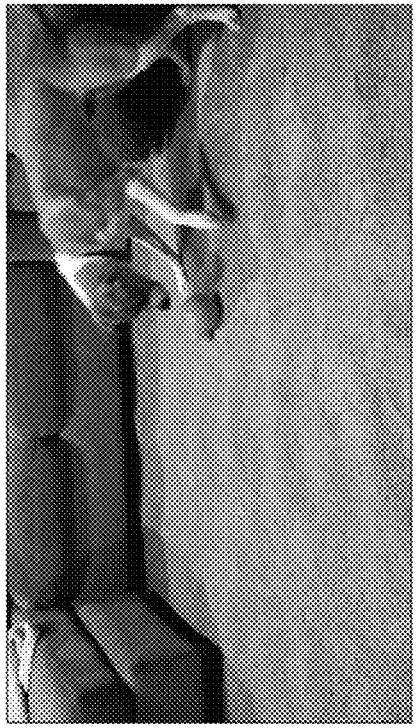
FIG. 5*b* is an image of the simulated 250 Hz Lissajous movie.
Figure 5C:
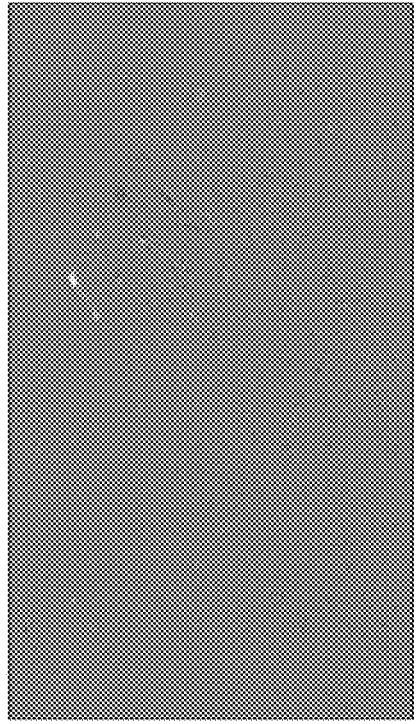
FIG. 5*c* is an image of the resulting interpolation similar to that seen in the last row of FIG. 3.
Figure 5D:
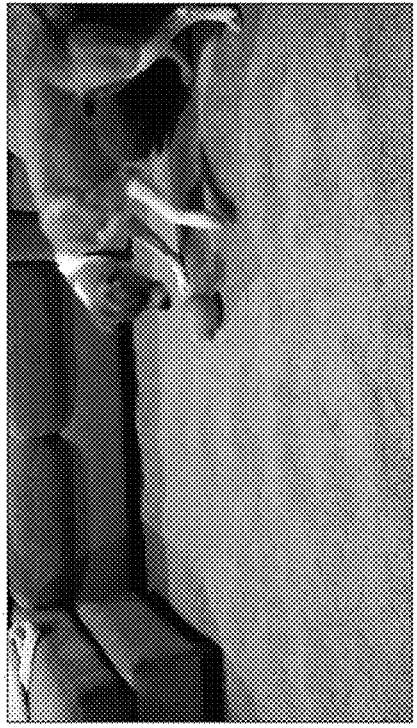
FIG. 5*d* is an image showing the difference of interpolated results from the original example movie, where gray corresponds to correct values, white corresponds to overestimated values, and black corresponds to underestimated values.

The quantitative accuracy of the inpainting image interpolation is most easily assessed in a situation where the ground truth is known a priori. A representative ground-truth video was captured with a CCD camera containing large objects moving in the field of view. Pixels were then selectively deleted from each frame in a simulated Lissajous trajectory for a 250 Hz frame-rate image and interpolated (FIGS. 5a-5d). FIG. 5a represents the original image. FIG. 5b shows the image after superimposing the same unsampled pixel pattern (as in row three of FIG. 3). The resulting interpolation is presented in FIG. 5c. Referring to FIG. 5d, for pixels that take on integer grayscale values of between 0 and 255, the interpolated pixels has an average error of 3.4 units (i.e., ±1.5% standard deviation in grayscale value) relative to the ground truth as displayed in the difference map (FIG. 5d), across the interpolated pixels of the image. Still referring to FIG. 5d, gray corresponds to correct values and white and black correspond to over- and underestimated values, respectively. Comparison with other inpainting algorithms are detailed in Appendix-A.

Conclusions

As described herein, Lissajous trajectory beam-scanning microscopy is coupled with image interpolation algorithms to enable >kHz frame rate imaging on multiple simultaneous data acquisition channels through relatively simple modification of a conventional beam-scanning microscope. Active phase stabilization of the resonant mirrors enabled the acquisition of high-resolution images from Lissajous trajectories several thousand oscillations of the resonant mirrors. By dicing the time-dependent data into smaller sub-trajectory sections, frame rates much higher than those achievable from the overall trajectory may be achieved. MBIR interpolation algorithms enabled reconstruction of the data missing from the unsampled pixels in the sub-trajectory images to produce images at several hundred Hz up to several kHz.

Lissajous trajectory microscopy is particularly advantageous over slow raster scanning techniques in multi-photon and nonlinear optical imaging by minimizing the laser dwell time per pixel. The two most well-established damage mechanisms are due to local heating effects and to undesired photochemistry arising from multi-photon absorption. Local heating arises from a competition between the rate of heat deposition from the incident beam(s) versus heat dissipation. By using high frequency resonant mirrors in the Lissajous microscope, only 2-3 consecutive laser pulses fall within the same focal volume in the central field of view, with long periods (tens to hundreds of μs) before that same pixel is sampled again in the trajectory. In contrast, conventional imaging using two galvanometer mirrors with 1 μs integration time per pixel and an 80 MHz source corresponds to ~80 consecutive laser pulses, for a >30 times higher local heating rate compared to Lissajous trajectory scanning In the corners of the Lissajous trajectory, the scan pattern does suffer from an increased consecutive pixel dwell time, where both resonant mirrors are simultaneously moving relatively slowly (FIG. 1b). However, adding an iris in the rear conjugate focal plane between the downstream telecentric lens pair provides a simple means to clip just the corners and allow for continuous use of high laser power.

While demonstrated herein using a pulsed laser source with synchronous digitization, many of the advantages of Lissajous trajectory imaging relate to continuous laser sources (e.g., in confocal fluorescence and confocal reflectance imaging). Given the relative ease with which the experimental hardware may be modified to enable Lissajous microscopy, adapting existing confocal microscopes for high frame rate acquisitions by modifications to the scan head and data acquisition electronics is possible.

EXAMPLE

Methods:

The Lissajous microscope utilized a Tsunami Ti:Sapphire oscillator (Spectra Physics) pumped by a Millenia Vs (Spectra Physics) CW visible laser operating at 5.0 W. The Tsunami produced femtosecond pulses centered around 800 nm, with an 80 MHz repetition rate, and a maximum power of ~1.0 W. The period of the Tsunami served as the master clock dictating all the subsequent timing of the resonant mirrors, feedback controls, and data acquisition electronics. The incident beam was coupled into the microscope by the first resonant mirror in the resonant mirror pair (Electro-Optical Products Corp.) operating at 5986 clock ticks (13.36 kHz), providing rapid scanning of the laser beam in the X direction. Using a telecentric lens pair (Thorlabs f=100 mm each), the incident beam was then coupled to the second resonant mirror operating with a period of 5300 clock ticks (15.09 kHz) to provide fast scanning in the Y direction. The beam was then passed through a second telecentric lens pair providing a 2.3× beam expansion (Thorlabs f=25.4 mm, f=60.0 mm) onto the back of a 10× objective (Optem, NA=0.30). The transmitted fundamental beam and the SHG signal were collected and recollimated by a condenser lens (Thorlabs, f=25.4 mm). The SHG signal was then split from the excitation beam by reflection off a 405 nm long pass dichroic mirror (Chroma, Z405RDC) and passed through a polarizing beam splitting cube (Thorlabs, PBS101). The two polarizations were collected by separate photomultiplier tubes (Hamamatsu, H10722-10) after each passed through filter stacks containing both a 400 nm interference filter (CVI, F40-400.0-4-1.00) and a KG3 (Thorlabs, FGS900) to reject the remaining incident 800 nm light. The transmitted 800 nm fundamental beam was passed through a Glan polarizer and focused by a lens (Thorlabs, f=25.4 mm) onto a photodiode (Thorlabs, DET10A) for detection of laser transmittance and birefringence. The polarization of the incident light was modulated by an electro-optic modulator (Conoptics, 350-160) placed in the beam path prior to the resonant mirror pair.

Precise timing control was maintained to enable the generation of high resolution images. Due to the high Q-factor of the resonant mirrors (Q>250) amplitude stability was achieved at the sacrifice of phase stability. To stabilize phase drift, a custom built Lissajous timing generator (LTG) control box was designed to perform real-time active phase correction of the resonant mirrors. The LTG was controlled by an 8-bit Microcontroller (Silicon Laboratories, C8051f120), running at 80 MHz derived from an external 10 MHz phase-lock loop (PLL) synchronous with the 80 MHz master clock from the Ti:Sapphire laser. The microcontroller runs a custom built, multitasking preemptive operating system using a combination of hardware and software timers to produce the X and Y mirror drive signals and epoch pulse, which marks the start of the Lissajous trajectory. The X,Y and epoch signals of the LTG were produced using the synchronous counters of the C8051f120 providing inherent phase lock among these 3 signals. Circuits external to the C8051f120 convert the sinusoidal feedback of the resonant mirrors into a digital signal used by the Microcontroller to compute and compensate for X and Y phase error upon the next iteration of the epoch pulse. User communication with the Microcontroller, to adjust mirror and epoch frequency, was performed via RS-232 with a custom LabVIEW application. The resonant mirrors used in the prototype Lissajous microscope were driven at 5300 and 5986 clock ticks, corresponding to 15.09 kHz and 13.36 kHz, respectively, for an approximate 7:8 trajectory (7.083:8) and a frame rate of ~5 Hz (Lissajous period of ~0.2 s).

Figure 6:
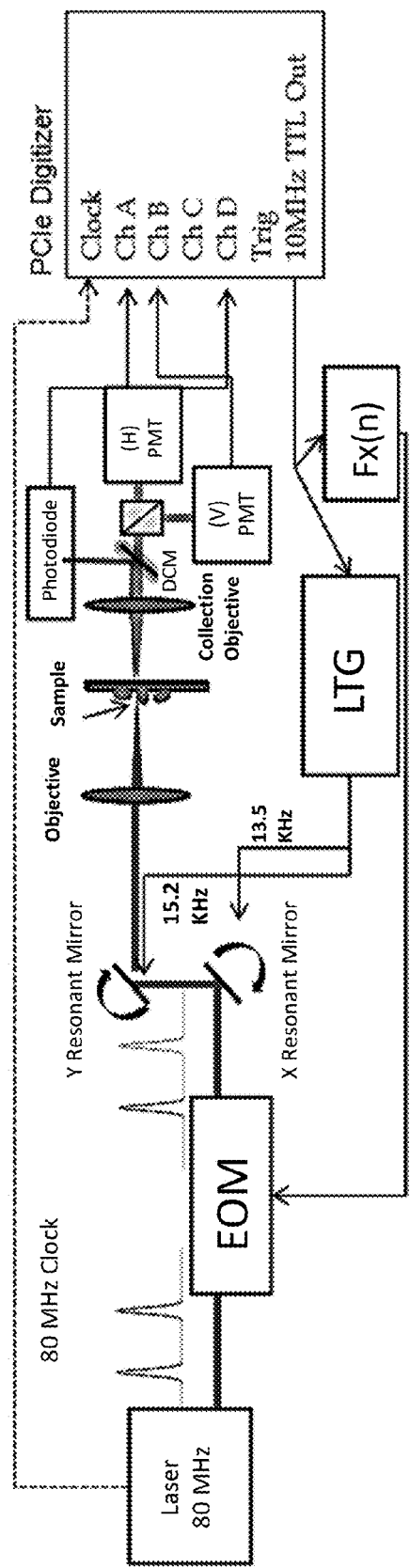
FIG. 6 is a schematic showing the timing diagramming for an embodiment of a Lissajous microscope.

Both data acquisition and a significant portion of the timing control was performed using PCI Express digital oscilloscope cards (AlazarTech, ATS 9462), which allowed for continuous streaming of every individual detection event (laser firing) simultaneously on up to 4 channels, although only 3 channels were used to perform the experiments described herein. The digitizer cards were clocked directly from the laser by a fast photodiode (Thorlabs, DET10A), which sampled a small portion of the laser beam to generate a clock signal. The digitizer cards AUX I/O port was configured to supply an output of the clock frequency divided by 8 (=10 MHz) in order to clock the LTG through a 10 MHz PLL. As a result the digitization electronics and the mirror drivers all run synchronously with the laser as the master clock (timing diagram, FIG. 6). In this manner, the position within the focal plane, of each pulse of the laser, could be determined with reasonably high confidence. The LTG epoch pulse was used to trigger the start of data acquisition with the digitizing oscilloscope cards.

The peak voltages from each detector following each individual laser pulse were digitized and the image(s) were reconstructed according to equation 1. Two separate analyses were performed on each single time-dependent data set. In one, each entire trajectory was binned into a single final high resolution image. Alternatively (and simultaneously), the images were separated into sub-frames of the trajectory resulting in higher frame rates of more sparsely sampled images. In either case, the sine-wave trajectory of the resonant mirrors results in non-uniform pixel density across the sample, with higher density near the edges and corners of the image where the resonant mirrors were moving the slowest (turning points). Consequently, some pixels were sampled many times, some fewer times, and in the case of fast sub-frames, some pixels not sampled at all.

Additional disclosure is found in Appendix-A, filed herewith, entirety of which is incorporated herein by reference into the present disclosure.

Those skilled in the art will recognize that numerous modifications can be made to the specific implementations described above. The implementations should not be limited to the particular limitations described. Other implementations may be possible.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

REFERENCES

1. Demuro, A. & Parker, I. Multi-dimensional resolution of elementary Ca2+ signals by simultaneous multi-focal imaging. *Cell Calcium* 43, 367-374, (2008).
2. Horio, T. & Suzuki, T. Multihit two-dimensional charged-particle imaging system with real-time image processing at 1000 frames/s. *Rev. Sci. Instrum.* 80, 13706/1-13706/8, (2009).
3. Petty, H. R. Applications of high speed microscopy in biomedical research. *Opt. Photonics News* 15, 40-45, (2004).
4. Holdsworth, D. W. et al. Simultaneous vibration and high-speed microscopy to study mechanotransduction in living cells. *Proc. SPIE* 8317, 831715/1-831715/6, (2012).
5. Oron, D., Tal, E. & Silberberg, Y. Scanningless depth-resolved microscopy. *Opt. Express* 13, 1468-1476, (2005).
6. Tomer, R., Khairy, K. & Keller, P. J. Light sheet microscopy in cell biology. *Methods Mol. Biol.* 931, 123-137, (2013).
7. Pashaie, R. & Falk, R. Single optical fiber probe for fluorescence detection and optogenetic stimulation. *IEEE Trans. Biomed. Eng.* 60, 268-280, (2013).
8. Jacobson, K. Fluorescence recovery after photobleaching: lateral mobility of lipids and proteins in model membranes and on single cell surfaces. *NATO Adv. Study Inst. Ser. A.* A34, 271-288, (1980).
9. Piston, D. W. et al. Two-photon-excitation fluorescence imaging of three-dimensional calcium-ion activity. *Appl. Opt.* 33, 662-669, (1994).
10. Lee, Y.-J. et al. Structural characterization of wavelength-dependent Raman scattering and laser-induced crystallization of silicon thin films. *Thin Solid Films* 542, 388-392, (2013).
11. Mohler, W., Millard, A. C. & Campagnola, P. J. Second harmonic generation imaging of endogenous structural proteins. *Methods* 29, 97-109, (2003).
12. Campagnola, P. J. et al. Three-dimensional high-resolution second-harmonic generation imaging of endogenous structural proteins in biological tissues. *Biophys. J.* 82, 493-508, (2002).
13. Both, M. et al. Second harmonic imaging of intrinsic signals in muscle fibers in situ. *J. Biomed. Opt.* 9, 882-892, (2004).
14. Kissick, D. J., Wanapun, D. & Simpson, G. J. Second-order nonlinear optical imaging of chiral crystals. *Annu. Rev. Anal. Chem.* 4, 419-437, (2011).
15. Fu, Y., Wang, H., Shi, R. & Cheng, J. X. Characterization of photodamage in coherent anti-Stokes Raman scattering microscopy. *Opt. Express* 14, 3942-3951, (2006).
16. Hoy, C. L., Durr, N. J. & Ben-Yakar, A. Fast-updating and nonrepeating Lissajous image reconstruction method for capturing increased dynamic information. *Appl. Optics* 50, 2376-2382, (2011).
17. Flusberg, B. A. et al. Fiber-optic fluorescence imaging. *Nat. Methods* 2, 941-950, (2005).
18. Flusberg, B. A. et al. In vivo brain imaging using a portable 3.9 gram two-photon fluorescence microendoscope. *Opt. Lett.* 30, 2272-2274, (2005).
19. Engelbrecht, C. J., Johnston, R. S., Seibel, E. J. & Helmchen, F. Ultra-compact fiber-optic two-photon microscope for functional fluorescence imaging in vivo. *Opt. Express* 16, 5556-5564, (2008).
20. Tuma, T. et al. High-speed multiresolution scanning probe microscopy based on Lissajous scan trajectories. *Nanotechnology* 23, 185501, (2012).
21. Bazaei, A., Yong, Y. K. & Moheimani, S. O. R. High-speed Lissajous-scan atomic force microscopy: Scan pattern planning and control design issues. *Rev. Sci. Instrum.* 83, 063701/063701-063701/063710, (2012).

22. Bertalmio, M., Sapiro, G., Caselles, V. & Ballester, C. in *Proceedings of the 27th annual conference on Computer graphics and interactive techniques* 417-424 (ACM Press/Addison-Wesley Publishing Co., 2000).
23. Ballester, C. et al. Filling-in by joint interpolation of vector fields and gray levels. *IEEE Trans. Image Process.* 10, 1200-1211, (2001).
24. Li, X. in *International Workshop on Local and Non-Local Approximation in Image Processing.* (2008).
25. Mairal, J., Elad, M. & Sapiro, G. in *Proc. of the 4th World Conf of the Int. Assoc. for Statistical Computing* (IASC). (2008).
26. Aharon, M., Elad, M. & Bruckstein, A. An algorithm for designing overcomplete dictionaries for sparse representation. *IEEE Trans. Signal Process.* 54, 4311-4322, (2006).
27. Bouman, C. & Sauer, K. A generalized Gaussian image model for edge-preserving MAP estimation. *IEEE Trans. Image Process.* 2, 296-310, (1993).
28. Pun, W. H. & Jeffs, B. D. in *Conference Record of the Twenty-Ninth Asilomar Conference on Signals, Systems and Computers.* 1472-1476 (IEEE, 1995).
29. Garcia, D. Robust smoothing of gridded data in one and higher dimensions with missing values. *Comput. Stat. Data An.* 54, 1167-1178, (2010).
30. Wang, G. et al. A three-dimensional gap filling method for large geophysical datasets: Application to global satellite soil moisture observations. *Environ. Modell. Softw.* 30, 139-142, (2012).
31. Sacconi, L., Dombeck, D. A., Webb, W., Overcoming photodamage in second-harmonic generation microscopy: Real-time optical recording of neuronal action potentials *Proc. Natl. Acad. Sci.,* 103, 3124-3129, (2006).
32. Venkatakrishnan, Singanallur V., Bouman, Charles A., Wohlberh, Brendt, "Plug-and-Play Priors for Model Based Reconstruction", *ECE Tech. Rep. Paper* 448 (2013).

The invention claimed is:

1. A method comprising:
    scanning a beam across a sample surface, wherein the scanning the beam is performed by two synchronized fast-scanning resonant mirrors of different resonant frequencies;
    retaining image data from the scanning into user-defined temporal bins, thereby resulting in user-defined frame-rates; and
    interpolating values of unsampled pixels using image inpainting techniques, wherein the inpainting techniques comprise at least one of a model-based image reconstruction (MBIR) method, or a discrete cosine transform (DCT) coupled with a penalized least squares (DCT-LS) method
    wherein the interpolating the values of the unsampled pixels comprises using at least one of special information, temporal information, polarization information, spectral information, or dimensional information.

2. The method of claim 1, wherein the user-defined frame-rates ranges up to and including 1 kHz frame-rate optical imaging.

3. The method of claim 1, further comprising achieving optical imaging on multiple simultaneous data acquisition channels.

4. A method comprising:
    scanning a beam across a sample surface, wherein the scanning the beam is performed by two synchronized fast-scanning resonant mirrors of different resonant frequencies;
    retaining image data from the scanning into user-defined temporal bins, thereby resulting in user-defined frame-rates; and
    interpolating values of unsampled pixels using image inpainting techniques, wherein the inpainting techniques comprise at least one of a model-based image reconstruction (MBIR) method, or a discrete cosine transform (DCT) coupled with a penalized least squares (DCT-LS) method, wherein the interpolating the values of the unsampled pixels comprises using at least one of special information, temporal information, polarization information, spectral information, or dimensional information.

5. The method of claim 4, wherein the user-defined frame-rates ranges up to and including 1 kHz frame-rate optical imaging.

6. The method of claim 4, further comprising achieving optical imaging on multiple simultaneous data acquisition channels.

7. A method comprising:
    scanning a beam across a sample surface, wherein the scanning the beam is performed by two synchronized fast-scanning resonant mirrors of different resonant frequencies;
    retaining image data from the scanning into user-defined temporal bins, thereby resulting in user-defined frame-rates, wherein the user-defined frame-rates ranges up to and including 1 kHz frame-rate optical imaging; and
    interpolating values of unsampled pixels using image inpainting techniques, wherein the inpainting techniques comprise a model-based image reconstruction (MBIR) method or a discrete cosine transform (DCT) coupled with a penalized least squares (DCT-LS) method, wherein the interpolating the values of the unsampled pixels comprises using at least one of special information, temporal information, polarization information, spectral information, or dimensional information.

8. The method of claim 7, further comprising achieving optical imaging on multiple simultaneous data acquisition channels.

* * * * *